Aug. 8, 1961            L. ROYS            2,995,223
DEMOUNTABLE STRUCTURAL FRAMES AND COUPLINGS THEREFOR
Filed May 12, 1959
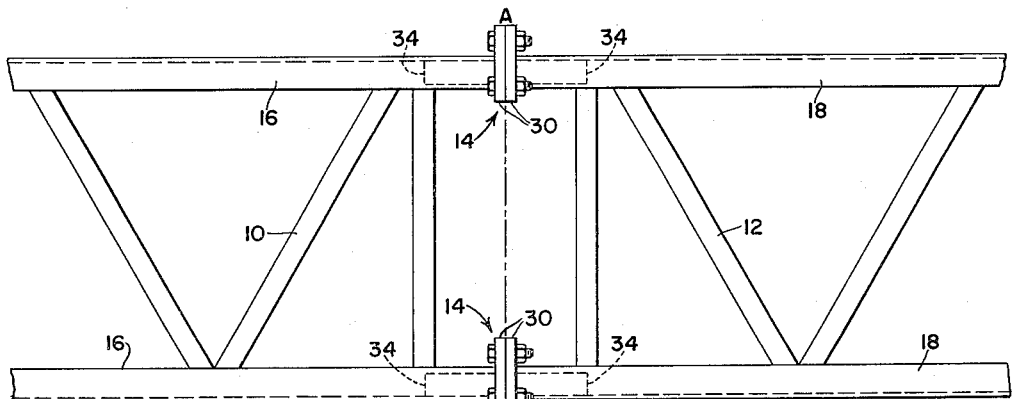
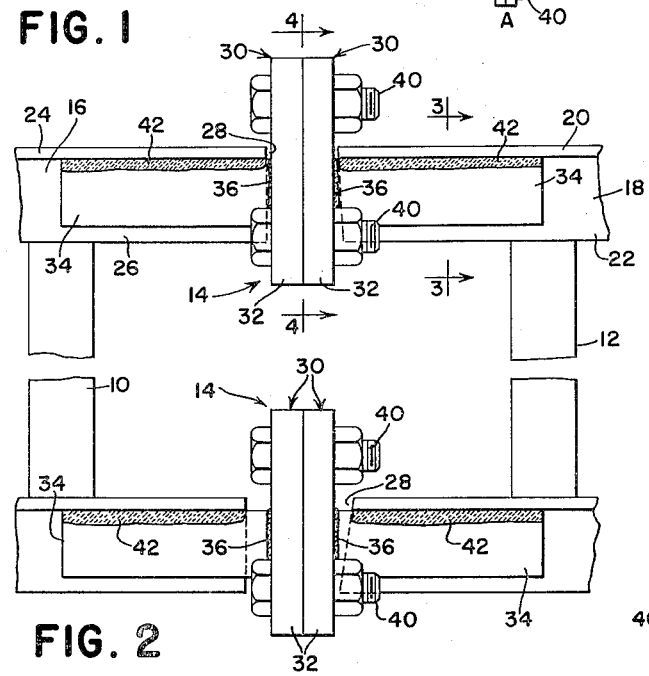
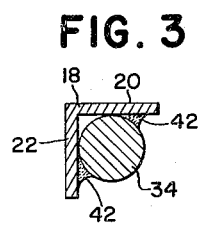
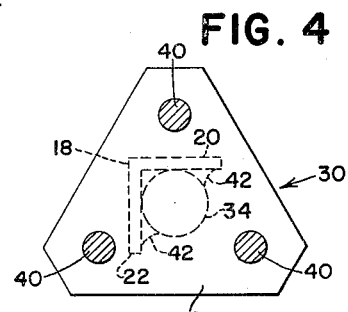
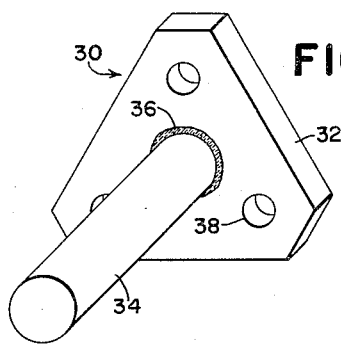
INVENTOR.
LAWRENCE ROYS
BY
ATTORNEY United States Patent Office 2,995,223
Patented Aug. 8, 1961

2,995,223
DEMOUNTABLE STRUCTURAL FRAMES AND COUPLINGS THEREFOR
Lawrence Roys, 825 27th St., Moline, Ill.
Filed May 12, 1959, Ser. No. 812,694
1 Claim. (Cl. 189—36)

This invention relates to improvements in skeletal structural frames such as derricks, booms, towers of skeleton construction, light bridge trusses and similar structures, and more particularly to improved means for coupling these sections together.

In general, sectional skeletal structures are known in the art and these are often fabricated in sections, transported in the same manner, and set up in the field. The assembly requires that the adjoining faces or corner posts of the sections must be interconnected with little or no strain or distortion, because stresses and strains in the connections introduce additional distortion or internal stress into the framework as a whole in the field.

Prior art couplings commonly involve abutting plates secured respectively to corner posts of the mating sections and these are bolted together. However, many complications attend this method of construction, because, primarily, the fit and accurate positioning of these abutting plates is extremely difficult, unless done in the shop at considerable expense. Moreover, after being pre-assembled, they must be disassembled for convenient shipping. This practice further requires the making of detailed drawings of the design of each section and shop-fabricating the individual sections with such accuracy that the adjoining faces or butting plates of any two sections will cooperate so perfectly that final tightening of the fastenings introduces no additional stress into the framework as a whole.

According to the present invention, the foregoing and other difficulties are eliminated by the provision of a novel coupling which enables fabrication in the shop, followed by assembly in the field without the difficulties noted above. In this respect, the invention features a coupling having a pair of elements releasably securable together, each element having thereon a stub or its equivalent that lies lengthwise of and is welded to an associated part of the derrick or similar structure. The paired elements of the structure are interconnected by the coupling in such manner that inaccuracies at the ends of the boom or derrick section are immaterial. It is a further feature of the invention to provide a coupling that eliminates the need for butt welding. The present coupling is therefore safer and more reliable than butt joints of the type previously known. Although the present coupling employs a butt weld between the stub and the plate, this weld can be made by downhand welding at the welder's bench under the most favorable conditions where inspection is convenient and easy and stress relieving can be accomplished in a controlled furnace.

It is an important object of the invention to utilize, in the connection of the stub to the strucural element, a pair or more of fillet welds, preferably of such extreme length that the unit stress in the weld will be so low that the work of any reasonably good welder would develop the full strength of the area of the stub. The invention features the nesting of the stub in an angle or equivalent member so that the fillet will pull the angle inward and there will be practically no internal stress in the weld after cooling, thus giving a balanced design and insuring adequate and even excess strength in this zone or joint where stress relief in a furnace is difficult or impossible.

The foregoing and other important objects and desirable features inherent in and encompassed by the invention will become apparent as a preferred embodiment thereof is disclosed, by way of example, in the ensuing description and accompanying sheet of drawings, the several figures of which are described below.

FIGURE 1 is a fragmentary elevation of a representative derrick or like structure embodying the improved coupling means.

FIGURE 2 is an enlarged elevation showing an interior portion of the structure and illustrating in greater detail the relationship of the coupling to the structural parts.

FIGURE 3 is a section on the line 3—3 of FIGURE 2.

FIGURE 4 is a section on the line 4—4 of FIGURE 2.

FIGURE 5 is a perspective of one-half of the coupling.

The representative boom, derrick etc. structure chosen for the purposes of illustration and included in FIGURES 1 and 2 comprises a pair of sections 10 and 12 interconnected by a plurality of the improved couplings, each designated in its entirety by the numeral 14. In a typical derrick or like structure, four corner elements or posts, such as those shown at 16, will be employed, appropriately braced by members as illustrated. The section 12 is similarly constructed, having four corner posts or elements 18. The sections may be otherwise constructed, but the importance is that they have end portions meeting, in most cases, in a common plane as suggested by the broken line A—A in FIGURE 1. However, not in every case will the sections be constructed to meet in a plane, and may even meet in offset planes or in other relationship. However, the present construction is typical of those known, at least to the extent of the environmental description, and it should therefore be understood that the invention is not to be limited beyond a scope as absolutely required.

As best shown in FIGURE 3, each of the elements 18 is an angle bar having angularly related flanges 20 and 22. The corner posts or elements 16 are similarly angle bars, having flanges 24 and 26.

By way of illustration, the junctions of the ends of the angle bars 16—18 are somewhat exaggerated as to angle and spacing, to demonstrate the fact that a considerable space as at 28 may occur between proximate ends. In the past, where butt-welded plates are relied upon to secure the sections together, spaces such as those shown here could positively not be tolerated. On the other hand, the elimination of such spaces or gaps can be achieved only at the expense of considerbale time, labor and painstaking detail. It is one of the features of the present invention, as pointed out above, that these problems are not present when the present inventive coupling is employed.

Each of the couplings comprises a pair of complementary halves, each designated in its entirety by the numeral 30. One of these is shown in perspective in FIGURE 5. Each coupling is composed of two basic parts, one being a preferably substantially triangular steel plate 32 and the other being a preferably cylindrical stub 34. As will be appreciated, the plates need not be triangular, but the triangular shape is convenient and has been used with success.

The stub 34 of each coupling is preferably butt-welded to its companion plate 32, as shown at 36 in FIGURE 5. However, the complete coupling half may be a forging or casting or other one-piece structure. As pointed out above, the weld at 36 may be made in the shop under the most favorable conditions. For all practical purposes, the coupling may be regarded as of one-piece construction. Each stub 34 is of relatively substantial length and is nested between the flanges 20 and 22 of the angle bar 18, for example, and the companion stub will be received in the related flanges 24 and 26 of the associated angle bar 16. It will be understood of course that there are as many couplings as there are corners or junctions between associated sections, regardless of the nature, type and design of the derrick or other skeletal framework in which the couplings are employed. Each coupling plate 32 is provided with a plurality of apertures, as at 38, and a purality of bolts 40 is used to secure companion coupling halves together.

Assembly of the couplings between the associated sections may be readily accomplished by preliminarily bolting each pair of coupling halves together and placing it in its proper junction so that the plates 32 occupy a major portion of the space or gap 28. The size of this gap, so long as it is wider than the thickness of the combined plates 32, is immaterial. Each coupling as thus preassembled may be temporarily clamped into place and the sections 10 and 12 adjusted until the plane of the abutting faces of each coupling becomes the plane for the abutting faces of all couplings, according to the example illustrated here, in which case the plane would include the line A—A of FIGURE 1. In instances in which stepped planes would accommodate the abutting faces, appropriate allowances would be made. In other cases in which the derrick or equivalent sections met at an angle or in some other relationship, the couplings would be designed accordingly. For example, the stubs 34 can be welded to the plates 32 at various angles. In the broadest sense, the plates 32 need not abut on a plane at right angles to the axis of the stub 34. The important thing is that the two sections 10 and 12, or their equivalents, are capable of being properly related and alined without detail paid to the manner in which the associated ends are trimmed. This comes within the previous statement that the gap at 28 or the particular angle at which the end portion happens to be cut off is largely immaterial.

After the following preassembly has been accomplished, as described above, the stubs 34 are welded to the respective angles by fillet welds as shown at 42 (FIGURE 3). Since the surface of the stub 34 is cylindrical and is nested between the flanges of the angle, it follows that a pair of longitudinal grooves will be afforded. These are adequate to accommodate the weld material for forming the fillet weld at 42.

It will be seen from the foregoing description that the coupling is a considerable improvement over those known in the prior art. The coupling is based on the principle that skeleton frameworks nad equivalent structures can be assembled section for section after preliminary fabrication without undue attention paid to accuracy in cutting off and adapting the end portions, because the coupling, as pointed out above, after preliminary assembly, can be adjusted longitudinally to a desired and determinable position, and then finally secured into place by the longitudinal weld or welds, or some equivalent such as brazing or cementing. Since the part is welded into place in the position it will ultimately occupy, final tightening of the bolts 40 will introduce no distortion in the structure. The substantial length of each stub is important from the standpoint of affording adequate welding surface; alhtough, this length will vary in proportion to the nature of the structure in which the coupling is used. The coupling is also usable in structures where the elements or members corresponding to those at 16 and 18 are not angles, because the stub can lie against a flat surface, or against related surfaces of members of other sections. The coupling can be prefabricated by mass-production methods in which accuracy is easily accomplished. Stubs can be lengthened according to the nature of the structure. For example, if the structure provides a situation in which the weld is relatively thin, the stub can be made longer and the thinness of the weld can be fully compensated for by the increased length of weld.

Features and advantages other than those enumerated herein will readily occur to those versed in the art, as will many modifications and alterations in the preferred structure disclosed, all of which may be achieved without departure from the spirit and scope of the invention.

What is claimed is:

In a demountable structure of the class described having a pair of elongated angle bars arranged in end-to-end relationship and in substantial alinement and with their proximate ends spaced apart lengthwise thereof to provide a space between said ends, the combination therewith of a coupling including a pair of coupling halves, each half comprising an apertured plate and a stub rigid with and substantially normally to said plate, said halves being arranged with their plates in face to face contact in the space between the ends of the bars and in a plane generally normal to the length of the bars, the stubs on the plates projecting respectively lengthwise of and nested in and welded to the angle bars; and means passed through the apertured plates for removably securing the coupling halves together.

References Cited in the file of this patent
UNITED STATES PATENTS

| | | |
|---|---|---|
| 2,308,565 | Mitchell | Jan. 19, 1943 |

FOREIGN PATENTS

| | | |
|---|---|---|
| 688,391 | France | May 12, 1930 |
| 1,070,800 | France | Feb. 24, 1954 |
| 407,456 | Great Britain | Mar. 23, 1934 |